United States Patent [19]

Breslin

[11] Patent Number: 5,214,011
[45] Date of Patent: May 25, 1993

[54] PROCESS FOR PREPARING CERAMIC-METAL COMPOSITE BODIES

[75] Inventor: Michael C. Breslin, Columbus, Ohio
[73] Assignee: BFD, Incorporated, Columbus, Ohio
[21] Appl. No.: 752,824
[22] Filed: Aug. 30, 1991
[51] Int. Cl.$^5$ .............. C04B 35/10; C04B 35/46; C04B 35/50; C04B 35/58
[52] U.S. Cl. .............. 501/127; 75/235; 501/126; 501/128; 501/96; 501/105; 501/104; 501/119; 501/125; 501/133; 501/152; 501/153
[58] Field of Search .............. 501/127, 126, 128, 153, 501/96, 105, 104, 119, 125, 133, 152; 75/235

[56] References Cited

U.S. PATENT DOCUMENTS

| | | | |
|---|---|---|---|
| 3,437,468 | 4/1969 | Seufert | 75/235 |
| 3,973,977 | 8/1976 | Wilson | 501/120 |
| 4,673,435 | 7/1987 | Yamaguchi et al. | 75/235 |
| 4,847,220 | 7/1989 | Lesher et al. | 501/927 |
| 4,874,569 | 10/1989 | Kuszyk et al. | 501/127 |
| 4,885,131 | 12/1989 | Newkirk | 501/127 |
| 4,886,766 | 12/1989 | Dwivedi | 501/128 |
| 4,891,345 | 1/1990 | Nadkanni et al. | 501/155 |
| 4,923,832 | 5/1990 | Newkirk et al. | 501/127 |
| 4,935,055 | 6/1990 | Aghajanian et al. | 501/127 |
| 4,940,679 | 7/1990 | Claar et al. | 501/127 |
| 4,956,319 | 9/1990 | Dwivedi et al. | 501/127 |
| 4,956,338 | 9/1990 | Rapp et al. | 501/127 |
| 4,957,779 | 9/1990 | Irick et al. | 501/127 |
| 4,960,736 | 10/1990 | Luxcz et al. | 501/127 |

OTHER PUBLICATIONS

Nagelberg, Solid State Ionics, 32/33 pp. 783–788 (1989).
Aghajanian et al., J. Am. Ceram. Soc. 73(9) pp. 2610–2614 (1990).
Creber et al., (preprint) Annual Conference on Composites and Adv. Ceram. Mat. Jan. 1988.
Newkirk et al., (preprint) Annual Conference on Composites and Adv. Ceram. Mat. Jan. 1987.
Prabriputaloong et al., J. Am. Ceram. Soc. Apr. (1973) pp. 184–185.
Urquhart, Advanced Materials and Processes Jul. 1991 pp. 25–29.
Schiroky et al., Am. Soc. of Mech. Eng. vol. GT316, Jun. 4–8, 1989 pp. 1–5.
Newkirk, et al., J. Mater. Res. 1(1) Jan./Feb. (1986) pp. 81–89.
Brondyke, J. Am. Ceram. Soc., 36(5) pp. 171–174 (1953).
Standage, J. Am. Ceram. Soc. vol. 50 No. 2 pp. 101–105 (1967).

*Primary Examiner*—Mark L. Bell
*Assistant Examiner*—C. M. Bonner
*Attorney, Agent, or Firm*—Dennis H. Rainear

[57] ABSTRACT

A process is presented for the fabrication of a metal/ceramic composite by a non-vapor phase oxidation of a molten metal by contacting said molten metal at an elevated temperature with a sacrificial ceramic preform. The shape of the preform is retained but the ceramic preform is reduced, oxidizing the molten metal. A preferred sacrificial ceramic preform is silica, but can also be, for example, mullite, titania or zirconia, and the preferred molten metal is aluminum or an aluminum alloy. Thus, for example, is produced from immersing a silica preform into molten aluminum alloy, an Al/Al$_2$O$_3$ composite metal/ceramic article which does not contain silica or silicon and which is extremely tough.

16 Claims, No Drawings

PROCESS FOR PREPARING CERAMIC-METAL COMPOSITE BODIES

TECHNICAL FIELD

The invention is directed to a non-vapor phase process for forming a ceramic-metal composite article by the reaction of a metal or metal alloy and a sacrificial ceramic preform. The molten metal or alloy is oxidized directly by the ceramic preform, wherein the preform serves as the oxidizer and also as the pattern or geometric form of the final composite article, as the cation of the sacrificial ceramic preform is replaced by a metal ion and the preform shape is retained in the form of a metal-ceramic composite.

BACKGROUND ART

Processes which convert molten aluminum to alumina/aluminum composite through vapor-phase oxidation have been developed by several individuals and companies, including for example, the Lanxide Corporation. The Lanxide DIMOX (directed metal oxidation) processes for preparing ceramic-metal composites requires vapor-phase transport for producing composite product. The Lanxide process (Newkirk, et al., J. Mater. Res. 1(1), January/February 1986, page 81–89) involves oxidation of a bulk molten metal, usually in an inert graphite or alumina crucible, by a gas to produce a solid ceramic-containing body via a directed growth process. The reaction product forms initially on the exposed surface of a pool of the molten metal and then grows outward, fed by transport of additional metal through channels in the ceramic product of the oxidation reaction between the parent metal and the gas phase oxidant. Direct oxidation reaction between silica-containing preform and molten aluminum alloy is not taught.

Brondyke has observed the chemical interaction between molten aluminum and silica. (Brondyke, J. Am. Cerm. Soc., 36 [5] 171–74 (1953)).

Standage et al., in J. Am. Cerm. Soc., vol. 50, no. 2, page 101–105, 1967, teach the reaction between vitreous silica and molten aluminum.

Prabriputaloong et al., J. Am. Ceram. Soc., April 1973, page 184–85, discusses the reduction of $SiO_2$ by molten aluminum.

It is known that infiltration of ceramic materials (e.g. $Al_2O_3$) with molten metal can result in metal/ceramic composites.

Prior art processes for the fabrication of alumina/aluminum matrix composites suffer from the limitation in three dimensional growth which tends to restrict the shape of the resulting composite articles. In addition, prior art processes require gas phase reaction. Finally, metal-ceramic articles produced by the conventional methods exhibit undesirable porosity, anisotropy and poor toughness for many applications.

There exists a need for a non-vapor phase process for the production of metal-ceramic articles with increased densification, improved ability to tailor the microhardness and toughness, and which process will produce articles of a predetermined arbitrary shape.

BRIEF DISCLOSURE OF INVENTION

The present invention relates to a process for preparing a metal/ceramic composite material. By the present invention, any sacrificial ceramic preform which is less thermodynamically stable than is the oxide, nitride, carbide, or sulfide of the chosen molten metal or molten metal alloy can be used to oxidize the molten metal or molten alloy to thereby produce a metal/ceramic, or metal/metal oxide composite. The invention includes, for example, a process for forming a metal/ceramic composite, said process comprising the non-vapor phase oxidation of a molten metal or alloy by contacting the molten metal or alloy, at an elevated temperature, to a sacrificial ceramic preform body, whereby the sacrificial ceramic preform body is at least partially reduced, oxidizing the metal to form a metal oxide, metal nitride, metal carbide, or metal sulfide ceramic component, and whereby the sacrificial ceramic preform body experiences reactive progression by the molten metal, and whereby a metal/ceramic composite is produced.

More specifically, it has been surprisingly discovered that one embodiment of the inventive process produces a composite comprising aluminum and alumina without requiring the conventional steps of vapor phase oxidation, powder pressing or physical phase distribution.

In one embodiment, the process of the present invention involves the reaction of a silica ($SiO_2$) or silica-containing sacrificial preform, which can be either polycrystalline or amorphous, with a molten aluminum alloy or molten aluminum. The silica-containing preform serves as the oxidizer, such as a source of oxygen, in the oxidation of the molten aluminum metal to the ceramic aluminum oxide, with concomitant reduction of silica to silicon dissolved in the molten aluminum. This non-vapor phase process and the composite materials produced thereby are significant advancements over the art. Metal/ceramic composite bodies of near net shape geometry are produced, wherein the geometry of the final body is dictated by the initial geometry of the sacrificial ceramic preform. In addition, the articles produced by the method of the present invention are extremely tough, and have good fracture and impact resistance.

DETAILED DESCRIPTION OF INVENTION

In the process of the present invention, a sacrificial ceramic body or preform, such as silica, mullite, titania, titanium carbide, magnesia, zirconia, zirconium carbide, zirconium nitride, silicon carbide, or silicon nitride, or a combination thereof, is placed in contact with a molten metal such as aluminum, iron, nickel, cobalt, an aluminum alloy, magnesium, titanium, tungsten, tantalum, yttrium, or niobium at a temperature greater than the melting point of the metal, but less than the melting point or softening point of the sacrificial ceramic preform. The preform and the molten metal are maintained in contact at the elevated temperature for a time sufficient to allow the preform to at least partially transform, and preferrably fully transform, into a ceramic metal oxide body containing a metallic phase. The resulting ceramic-metal composite article contains two phases, the first a ceramic based on the metal or metal alloy, and the second a metal, one or both of which phases may be continuous. The ceramic produced may be an oxide, nitride, carbide or sulfide depending on the nature of the starting preform body. By "metal" herein is meant pure metal or metals, metal alloys, intermetallic compounds, and mixtures thereof.

The sacrificial ceramic preform can contain whiskers, particulates, or fibers of one or more of the materials selected from the group consisting of silica, titania, zirconia, alumina, silicon nitride, and silicon carbide.

Thus, for example, a silica glass preform containing SiC, alumina, or silicon nitride fibers, particulates, or whiskers can be used in the present invention. The fibers or whiskers may or may not be totally replaced by the metal/metal oxide depending on the reaction temperature and the nature of the fibers, particulates, or whiskers. Alternatively, the fibers, particulates, or whiskers can be retained in the resulting ceramic-metal composite article by utilizing a lower reaction temperature.

In describing herein the "non-vapor phase oxidation of a molten metal by the sacrificial ceramic preform", oxidation is not to be unduly construed as being limited to the transference of one or more oxygen atoms, but shall also include the electron donor/acceptor reaction and electron sharing reactions between the sacrificial ceramic preform and the molten metal or metal alloy.

By "sacrificial ceramic preform" herein is meant the chemical sacrifice (i.e., chemical reduction) while retaining the macroscopic physical or geometric form, i.e., the chemical elements of the preform are sacrificed as the preform is reduced to thereby oxidize the molten metal to a metal oxide. The reduced preform components diffuse outwardly as a solute from the preform shape. The sacrificial ceramic preform can include, for example, an article or material comprising silica, mullite, titania ($TiO_2$), titanium carbide (TiC), zirconia ($ZrO_2$), zirconium carbide (ZrC), zirconium nitride (ZrN), silicon nitride ($Si_3N_4$), silicon carbide (SiC), magnesium oxide (MgO), titanium carbide (TiC), analogous sulfides, or mixtures thereof. Thus oxides, nitrides, sulfides, and carbides are all operative in the present invention.

Metals operative herein as the molten metal can include aluminum, iron, nickel, cobalt, magnesium, titanium, tantalum, tungsten, yttrium, niobium, mixtures thereof and alloys comprising one or more of the aforementioned metals.

It is not critical to the present invention that the sacrificial ceramic preform be an oxide, such as silica, since it can also be any material able to react with the molten metal to form a ceramic. Thus the ceramic formed can be an oxide, nitride, carbide, or sulfide of the molten metal. It is also not critical that the sacrificial ceramic preform be fully replaced by the metal and ceramic, since for some applications it may be desirable to retain an amount of porosity or silica or other ceramic such as silicon carbide or silicon nitride in the final composite. The amount of remaining ceramic from the preform can be controlled according to the present invention by controlling the reaction time and temperature. A reduction in the reaction time can produce articles with residual sacrificial ceramic preform in addition to the metal and metal oxide phases. However, metal-ceramic composites prepared by the present invention exhibit increased hardness, often decreased porosity, and improved toughness as the sacrificial ceramic preform is replaced with metal and metal oxide.

A volume reduction in the resulting ceramic component relative to the volume of the starting preform is achieved in the present invention. As the silica sacrificial ceramic preform is replaced by metal oxide, such as alumina, there is a significant volume contraction of the ceramic of approximately 25 volume per cent. The volume reduction is due to the $Al_2O_3$ or other metal oxide or ceramic products having smaller volume per mole of oxygen than $SiO_2$, or $TiO_2$, or $ZrO_2$ of the sacrificial ceramic preform. Therefore, the transformation product must have a smaller volume per mole of oxygen than the sacrificial ceramic preform compound. For the replacement of titania in a sacrificial preform by aluminum, the volume change is about 9%. When the ceramic oxide such as $SiO_2$, is brought into contact with the molten metal, such as aluminum, the reaction starts immediately and the outer ceramic oxide layer is transformed into metal oxide, rejecting silicon, or titanium, or zirconium into the metal melt. It is known that there is a very high solubility for silicon in molten aluminum. Because there is a large decrease in solid volume upon transformation, large tensile stresses develop in the layer of metal oxide formed. Eventually the layer cracks, likely producing cracks in the ceramic oxide preform to which it is bonded. This permits the molten metal to reach deeper into the preform structure. Also, this cracking roughens the melt/ceramic oxide interface. This produces some channels in the reactive progression surface which allows molten Al or other molten metal to flow further inwardly. It is believed that the rough cracked surface requires that the metal oxide growth direction varies locally. This destroys any strong crystallographic texture in the resulting ceramic article. The reaction is maintained and sustained by the continuous flow of molten metal through channels created by cracking of the transformation product. This complicated three dimensional contraction and cracking leads to interconnected blocks of metal oxide with interconnected metal present. Reduced preform material such as elemental Si, Ti, or Zr travels or diffuses from the area of higher concentration within the preform out to the area of lower concentration in the molten metal. It is believed, but the inventor does not wish to be limited to the theory, that as the sacrificial ceramic preform is reduced, the molten metal is oxidized to metal oxide and the molten metal flows through channels in the reaction product permitting the reaction to continue. This leaves reduced metal, such as silicon, titanium, or zirconium in solution which diffuses out into the bulk molten metal surrounding the preform. Analysis of ceramic-metal composites prepared by the present invention indicated, for example, the dramatic reduction of the silicon content in composites prepared from a silica-containing preform.

By this process, metal/ceramic composites have been successfully grown at temperatures between about 1000 and about 1250 degrees Centigrade and growth rates of 8 cm/day have been observed. It has been discovered that the growth rate is related to the process temperature and an increase in temperature will produce an increase in growth rate. The dimensions of the transformed composite are the same as the initial preform to within experimental resolution (i.e., <1% change). The molar volume reduction is replaced or accounted for by the infusion of the molten metal so that the initial shape and size of the preform is maintained.

Conventionally, one would not normally heat the Al metal alloy to more than 300 degrees over its melting point and it is surprising that this results in the reactive progression according to the present invention as a solid state transformation.

In the present invention, the reaction utilized is represented by the following:

$$A_wB_x + M \rightarrow B_yM_z + A$$

where $A_wB_x$ is the sacrificial ceramic preform, and M can be Al, Fe, Ni, Co, Mg, Ti, Ta, W, Y, or Nb. B can be oxygen, nitrogen, sulfur, or carbon. The subscripts w, x, y, and z need not be equal and can be independently selected depending on the molecular stoichiometry of the ceramic preform composition. $A_wB_x$ can be selected from a wide range of compounds including: silicon dioxide, titanium dioxide, magnesium oxide, silicon nitride, silicon carbide, titanium carbide, zirconium dioxide, zirconium carbide, zirconium nitride, and mixture thereof such as mullite. Carbides, oxides, sulfides, and nitrides of reactive metals are all expected to be operative in the present invention. It is recognized that the resulting reduced metal, A, can react with the molten metal, M, to form another compound.

Thus, the present invention relates to a process for forming a metal/ceramic composite comprising the non-vapor phase oxidation of a molten metal by exposure of the molten metal at an elevated temperature to a sacrificial ceramic preform body, whereby the sacrificial ceramic preform body acts as an oxidizer of the metal and also as a pattern for the shape of the metal/ceramic composite.

Thus, self supporting ceramic composite bodies are produced by reactive progression of a parent metal as a solid state transformation into a sacrificial ceramic preform. The reactive progression typically results in a composite comprising an oxidation product (ceramic or metal oxide), and a residual metal.

The invention relates to a non-vapor phase method for producing composite ceramic articles by reactive progression of metal into a sacrificial ceramic preform, said preform preferrably but not necessarily comprising silica. Unlike the prior art, dross materials and fillers are not required in the process of the present invention.

In a preferred embodiment of the present invention, the sacrificial ceramic preform can be silica, quartz, sand, wollastonite, mullite, silicate glass, fluorosilicate glass, fluoroborosilicate glass, aluminosilicate glass, calcium silicate glass, calcium aluminum silicate glass, and calcium aluminum fluorosilicate glass, and the like and mixtures thereof. Any silica source is operative herein if Al is able to displace Si and thereby form $Al_2O_3$. Higher melting or softening point silicates are preferred, thus quartz or polycrystalline silica and mullite are the most preferred silicas. Lower softening point silicas are less likely to maintain the desired shape.

The sacrificial ceramic preform can also be an oxide, carbide, or nitride or mixture thereof.

The silica-containing preform can be readily prepared in the shape and size of the desired ultimate ceramic article and thereby serve as a geometric form or pattern for the final article.

It is also preferred herein that the metal or metal alloy be molten to serve as a bath to receive the ceramic oxide-containing preform. The preferred metals are aluminum and titanium. The alloy can have a content comprising titanium, aluminum, sources of aluminum, and other metals such as zirconium, hafnium, silicon, magnetized or non-magnetized iron, nickel, cobalt, and magnesium. In one example, the content of the alloy is aluminum, silicon (7.0 weight %) and magnesium (0.3 weight %). Another alloy useful in the present invention is aluminum alloy Alcoa 356, available from Alcoa of Pittsburgh, Pa.

The sacrificial ceramic preform and the molten metal are preferrably contacted such that there is direct and maximum surface contact between the preform and the molten metal. Because the oxidation reaction can be conducted within the preform or crucible and completely under the surface level of the molten metal, it is clear that a gas phase oxidant or an oxidizing atmosphere is not required in the present invention. This is quite different from the prior art and the Lanxide DIMOX process.

In one embodiment of the process of the present invention, a $SiO_2$-containing preform decomposes or at least partially decomposes at the elevated temperature of the molten alloy to the extent necessary for the preform to serve as an oxidizer for the oxidation of the liquid metal in the molten aluminum bath to aluminum oxide. The other reaction product is silicon in solution. The silica-containing preform also serves the purpose of dictating the geometry of the final composite body as the aluminum from the molten alloy and aluminum oxide penetrate and replace the silica-containing preform, displacing the silicon atoms. The reaction product typically contains both interconnected alumina and interconnected aluminum. In this manner was prepared a ceramic composite coil-shaped article by immersing a quartz coil or helix in a molten aluminum alloy. The resulting coil-shaped ceramic article had approximately 70 volume per cent alumina and about 30 volume per cent aluminum metal, wherein the alumina was a continuous phase and the Al metal was also continuous. It is believed that at higher process temperatures the percentage of aluminum metal present in the resultant article is less than in comparable articles produced at lower process temperatures. Increased continuity of the alumina phase and reduced continuity of the aluminum phase is achievable at higher process temperatures.

In another embodiment of the present invention, a molten aluminum alloy is poured into a sacrificial ceramic crucible or receptacle which serves as a preform rather than immersing the preform in a molten alloy bath. As discussed above, the ceramic oxide (e.g. $SiO_2$) of the preform serves to both donate oxygen sufficient to oxidize or at least partially oxidize an amount of the aluminum metal in the molten alloy to aluminum oxide, and also as a mold, model, or pattern for the resulting article. The molten alloy then conforms to the shape of the ceramic oxide crucible or receptacle, penetrates the crucible or receptacle, and the aluminum replaces the non-oxygen atoms in the preform with aluminum atoms and aluminum oxide molecules, to produce the final ceramic-metal composite article. The final article no longer contains the original ceramic oxide (such as silica) but is an aluminum/alumina composite.

In yet another embodiment of the present invention, a silica-containing preform crucible or receptacle is both filled with and immersed in the molten aluminum alloy to thereby increase the rate of migration of aluminum metal into the preform and facilitate the reduction of silica to silicon which is readily dissolved in the surrounding molten aluminum.

According to the present invention, it is believed that the amount of metal in the final product can be increased if the preform porosity is increased.

The articles produced by the process of the present invention can have a continuous phase of aluminum oxide and a discontinuous phase of aluminum metal.

The articles produced by the process of the present invention can also have a continuous phase of aluminum metal from the reduction of the silica followed by replacement of the silica with alumina, wherein the aluminum phase is discontinuous.

By the present invention, it is also possible to have both the metal and the aluminum oxide exist in continuous phases which are each infinite or extended matrices or clusters extending throughout the resulting article.

The composite product of the present invention was tested for continuity of the metal phase by means of conductivity measurement. In near cube-shaped (and others) samples, an electric current was found to flow across neighboring and opposite faces, confirming continuity of the metal phase. To test the continuity of the ceramic phase, the samples were placed in concentrated hydrochloric acid to dissolve out the metal phase. In all cases, the metal was removed and the structure retained its original cubic shape, albeit with high porosity. This confirmed the continuity of the ceramic phase, since a lack of continuity of the ceramic phase would cause the acid-etched samples to collapse.

A separate test for continuity of the ceramic phase of the articles produced by the present invention is to heat the article to a temperature well above the melting point of the metal. Thus, for example, when the molten metal used was pure Al, which has a melting point of approximately 660 degrees Centigrade, the composite article would be heated to about 1000 degrees Centigrade. The ability of the articles produced by the present invention to retain the geometry as well as the physical strength at this high temperature illustrates continuous metal oxide phase has been formed to a significant extent.

The articles produced by the process of the present invention comprise a ceramic/metal composite. The inventive composites have relatively high hardness (Rockwell A), electrical conductivity which may be tailored, and are quite resistant to fracture. The specific property values can be varied as desired by modification of the processing parameters, including but not limited to, temperature, aluminum alloy melt composition, porosity of the preform, composition of the preform, phase distribution in the preform, and reaction time.

In one example of the present invention, Si and Mg were added at one weight per cent levels to an aluminum alloy (Alcoa 356) which already contained 7.0% Si and 0.3% Mg. The addition was done during an induction melt prior to the process reaction. The modified Alcoa 356 alloy was then solidified, cooled and cut into smaller pieces. These Al sections were put into silica crucibles, type F-29 obtained from Ferro Corporation, of Crooksville, Ohio and heated in air to a temperature between 1200 and 1500 K. The temperature was maintained for a period of time which was varied from about several hours up to two days. The furnace was then turned off and the contents allowed to slowly cool in air. The resulting crucibles were no longer silica, but were an aluminum/alumina ceramic composite. Samples were also prepared without an induction melt and with essentially pure aluminum without the addition of extra Si or Mg. The composite articles thus produced also exhibited excellent strengths and continuity of phases.

In another example of the present invention, a geometry-specific quartz preform was submerged into the molten Alcoa 356 aluminum alloy yielding a composite body having the same shape as the preform. In this manner quartz rods of 10 millimeters diameter have been fully transformed to aluminum/alumina composites in less than 3 hours at 1473 K.

The metal/ceramic composites of the present invention have a bulk density ranging from approximately 3.3 to 3.5 grams per cubic centimeter based on mass-water displacement method. Rockwell A hardness values of the products of the present invention can range from, but are not limited to, for example, about 60 to about 75.

Modulus of rupture tests (3-point MOR) on the ceramic-metal articles of the present invention yielded values ranging from at least 22 kpsi to greater than 45 kpsi. However, these values are not limitations in the present invention and can be varied by the modifications described herein. The samples for the MOR test were cut by the Orton Foundation, Westerville, Ohio to produce test specimens which did exhibit some undesirable surface cracks. It is believed that the presence of these cracks has substantially reduced the MOR values. It is anticipated that samples produced with fewer and smaller surface cracks will exhibit substantially higher MOR strengths.

X-ray diffraction analysis of the composites of the present invention confirmed that the components were aluminum and alpha-alumina (corundum). Grain diameters in the present invention can be less than 1 micron and up to greater than about 70 microns, but tend to be irregular in shape. The ability of the instant process to produce smaller grain diameters is another advantage of the present invention over the Lanxide DIMOX process, which generally produces grains of sizes greater than 10 microns. This is an important feature of the present invention because, in general, smaller grain sizes produce higher fracture toughness in ceramic materials.

Also, the composite articles of the present invention have low coefficients of thermal expansion, ranging from about $9.6 \times 10^{-6}$ per degree Centigrade to about $12.25 \times 10^{-6}$ per degree Centigrade, and good thermal conductivity ranging from about 34 to about 60.25 Watts/(meter)(degrees Centigrade). These features make the articles of the present invention desirable for use in the manufacture of substrates for integrated circuit chips and devices, high temperature combustion engines, and applications needing heat dissipation, wear resistance and low density.

In addition, the bulk density of articles produced by the Lanxide DIMOX process is generally 2.9 to 3.5 grams per cubic centimeter, while the bulk density of articles prepared by the present invention is generally in the range of from 3.3 to 3.5 grams per cubic centimeter.

Another distinctive feature of the present invention relative to the Lanxide DIMOX process is the use herein of a sacrificial geometric preform and also the ability to obtain near-net shape of the final article.

Yet another advantage of the present invention is the high product growth rate of approximately 8 centimeters per day compared to 2.5 to 3.8 centimeters per day in the Lanxide DIMOX process.

Still another advantage of the present invention is the ability to run the reaction in an oxygen free environment such as an argon blanket, or Ar/H mix, or under a full or partial vacuum. Thus the present invention avoids undesirable side oxidation reactions which can occur in the Lanxide DIMOX process and other prior art processes. Because the Lanxide DIMOX process is based on gas-phase oxidation of molten metal, the reaction front remains planar, even on the microscopic scale. Therefore, in the prior art, the Lanxide oxide grows as colonies about 0.5 millimeters in diameter. In addition, the Lanxide DIMOX process grows product with planes perpendicular to the growth direction, that is, the colony growth direction is the c axis of the hexagonal alpha-alumina, and the intercellular region has a very different structure than the regions within the cells. In the present invention, however, the composite product growth is more random and homogeneous. This randomness in growth is important because it produces more isotropic and homogeneous properties in the products than obtainable in the prior art. Thus, the present composite structure viewed along the growth direction is indistinguishable from that viewed along the longitudinal direction.

Furthermore, unlike the products of the Lanxide DIMOX process, the composite articles of the present invention have no strong crystallographic texture.

Finally, the Lanxide DIMOX process relies on the presence of trace elements in the aluminum, a requirement not present in the instant invention.

The materials prepared by the present invention will be useful in high temperature components, electronic packaging materials, ceramic filters, conducting ceramics, and magnetic ceramics. It is also expected that the materials of the present invention will be useful in automotive engine and brake components, metal working dies, wear resistant and mining components, armor, cutting tools, grinding and abrading tools, cutlery and flatware, composite components including metal matrix composites and dual scale composites. Additionally, useful articles can be prepared by the present invention in the form of airframes, prosthetic devices and components, surface coatings and impellar and pump components.

Other advantages and utilities of the present invention will become apparent to those skilled in the art. While certain preferred embodiments of the present invention have been disclosed in detail, it is to be understood that various modifications may be adopted without departing from the spirit of the invention or scope of the following claims.

That which is claimed is:

1. A process for forming an aluminum/ceramic composite comprising the non-vapor phase oxidation of molten aluminum achieved by contacting the molten aluminum to a sacrificial ceramic body, wherein the molten aluminum is at a temperature at least 300 degrees above the melting point of aluminum but below the softening point of the ceramic body, wherein the sacrificial ceramic body is a material selected from the group consisting of silica, quartz, sand, wollastonite, mullite, silicate glass, fluorosilicate glass, fluoroborosilicate glass, aluminosilicate glass, calcium silicate glass, calcium aluminum silicate glass, calcium aluminum fluorosilicate glass, titanium dioxide, titanium carbide, zirconium dioxide, magnesium oxide, silicon nitride, silicon carbide, zirconium carbide, zirconium nitride, metal sulfides, and mixtures thereof, whereby the sacrificial ceramic body at least partially oxidizes the aluminum to form an aluminum oxide ceramic component, and wherein molten aluminum flows into the aluminum oxide ceramic component, and wherein the sacrificial ceramic body is at least partially reduced, whereby an aluminum/ceramic composite is produced possessing a near net shape relative to the shape of the sacrificial ceramic body.

2. The process of claim 1 wherein the molten aluminum metal is an alloy comprising one or more of the metals selected from the group consisting of iron, cobalt, magnesium, titanium, tantalum, tungsten, yttrium, niobium, zirconium, and hafnium.

3. The process of claim 1 wherein the composition of the sacrificial ceramic body is amorphous.

4. The process of claim 1 wherein the composition of the sacrificial ceramic body is crystalline.

5. The process of claim 1 wherein the composite produced comprises aluminum/alumina.

6. The process of claim 1 wherein the composite produced has a continuous aluminum phase.

7. The process of claim 1 wherein the composite produced has a continuous ceramic phase.

8. The process of claim 1 wherein the composite produced has a continuous aluminum phase and a continuous ceramic phase.

9. The process of claim 2 wherein the alloy further comprises silicon.

10. The process of claim 1 wherein the sacrificial ceramic body comprises a material which is polycrystalline silica.

11. The process of claim 1 wherein the sacrificial ceramic body comprises a material which is amorphous silica.

12. The process of claim 1 wherein the composite produced is substantially free of the cation of the material of the sacrificial ceramic body.

13. A process for forming a metal/ceramic composite comprising the non-vapor phase oxidation of a molten metal selected from the group consisting of iron, nickel, cobalt, magnesium, titanium, tantalum, tungsten, yttrium, hafnium, niobium and zirconium, achieved by contacting the molten metal to a sacrificial ceramic body, wherein the molten metal is at a temperature significantly above the melting point of the metal but below the softening point of the ceramic body, wherein the sacrificial ceramic body is a material selected from the group consisting of silica, wollastonite, mullite, fluorosilicate glass, fluoroborosilicate glass, aluminosilicate glass, calcium silicate glass, calcium aluminum silicate glass, calcium aluminum fluorosilicate glass, titanium dioxide, titanium carbide, zirconium dioxide, magnesium oxide, silicon nitride, silicon carbide, zirconium carbide, zirconium nitride, metal sulfides, and mixtures thereof, whereby the sacrificial ceramic body at least partially oxidizes the metal to form a metal oxide ceramic component, and wherein molten metal flows into the metal oxide ceramic component, and wherein the sacrificial ceramic body is at least partially reduced, whereby a metal/ceramic composite is produced possessing a near net shape relative to the shape of the sacrificial ceramic body.

14. The process of claim 13 wherein the molten metal is an alloy comprising two or more of the metals selected from the group consisting of aluminum, iron, nickel, cobalt, magnesium, titanium, tantalum, tungsten, yttrium, niobium, zirconium, and hafnium.

15. The process of claim 13 wherein the metal in the metal/composite produced comprises an intermetallic compound.

16. A ceramic composite article produced by a method comprising the non-vapor phase oxidation of a molten metal selected from the group consisting of iron, nickel, cobalt, magnesium, titanium, tantalum, tungsten, yttrium, niobium, zirconium, and hafnium, by contacting the molten metal to a sacrificial ceramic body, wherein the molten metal is at a temperature significantly above the melting point of the metal but below the softening point of the ceramic body, wherein the sacrificial ceramic body is a material selected from the group consisting of silicon dioxide, titanium dioxide, titanium carbide, zirconium dioxide, mullite, magnesium oxide, silicon nitride, silicon carbide, zirconium carbide, zirconium nitride, metal sulfides, and mixtures thereof, whereby the sacrificial ceramic body at least partially oxidizes the metal to form a metal oxide ceramic component, and whereby the metal oxide ceramic component contains the molten metal, and whereby a ceramic composite article is produced possessing a near net shape relative to the shape of the sacrificial ceramic body.

* * * * *

(12) EX PARTE REEXAMINATION CERTIFICATE (5862nd)
United States Patent
Breslin

(10) Number: US 5,214,011 C1
(45) Certificate Issued: Aug. 21, 2007

(54) PROCESS FOR PREPARING CERAMIC-METAL COMPOSITE BODIES

(75) Inventor: Michael C. Breslin, Columbus, OH (US)

(73) Assignee: BFD Incorporated, Columbus, OH (US)

Reexamination Request:
No. 90/007,136, Oct. 19, 2004

Reexamination Certificate for:
Patent No.: 5,214,011
Issued: May 25, 1993
Appl. No.: 07/752,824
Filed: Aug. 30, 1991

(51) Int. Cl.
*C04B 35/65* (2006.01)

(52) U.S. Cl. .................. 501/127; 30/346.54; 30/350; 501/104; 501/105; 501/133; 501/152; 501/153; 501/128; 501/119; 501/125; 501/126; 75/235

(58) Field of Classification Search ............ 501/96, 501/104, 105, 119, 125, 126, 127, 128, 133, 501/152, 153; 75/235
See application file for complete search history.

(56) References Cited

U.S. PATENT DOCUMENTS 2,702,750 A   2/1955   George
4,871,008 A * 10/1989   Dwivedi et al. ............... 164/6

OTHER PUBLICATIONS

CRC Handbook of Chemisty and Physics, CRC Press, Inc., 66th ed., 1985, back inside jacket (both pages).*
Walter H. Gitzen, Alumina as a Ceramic Material, Pub. 1970.

* cited by examiner

*Primary Examiner*—Stephen Stein

(57) ABSTRACT

A process is presented for the fabrication of a metal/ceramic composite by a non-vapor phase oxidation of a molten metal by contacting said molten metal at an elevated temperature with a sacrificial ceramic preform. The shape of the preform is retained but the ceramic preform is reduced, oxidizing the molten metal. A preferred sacrificial ceramic preform is silica, but can also be, for example, mullite, titania or zirconia, and the preferred molten metal is aluminum or an aluminum alloy. Thus, for example, is produced from immersing a silica preform into molten aluminum alloy, an $Al/Al_2O_3$ composite metal/ceramic article which does not contain silica or silicon and which is extremely tough.

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1–12 is confirmed.

Claim 16 is cancelled.

Claim 13 is determined to be patentable as amended.

Claims 14–15, dependent on an amended claim, are determined to be patentable.

13. A process for forming a metal/ceramic composite comprising the non-vapor phase oxidation of a molten metal selected from the group consisting of iron, nickel, cobalt, [magnesium,] titanium, tantalum, tungsten, yttrium, hafnium, niobium and zirconium, achieved by contacting the molten metal to a sacrificial ceramic body, wherein the molten metal is at a temperature significantly above the melting point of the metal but below the softening point of the ceramic body, wherein the sacrificial ceramic body is a material selected from the group consisting of silica, wollastonite, mullite, fluorosilicate glass, fluoroborosilicate glass, aluminosilicate glass, calcium silicate glass, calcium aluminum silicate glass, calcium aluminum fluorosilicate glass, titanium dioxide, titanium carbide, zirconium dioxide, magnesium oxide, silicon nitride, silicon carbide, zirconium carbide, zirconium nitride, metal sulfides, and mixtures thereof, whereby the sacrificial ceramic body at least partially oxidizes the metal to form a metal oxide ceramic component, and wherein molten metal flows into the metal oxide ceramic component, and wherein the sacrificial ceramic body is at least partially reduced, whereby a metal/ceramic composite is produced possessing a near net shape relative to the shape of the sacrificial ceramic body.

* * * * *